United States Patent
Sakaguchi (12) United States Patent (10) Patent No.: US 8,011,011 B2
(45) Date of Patent: Aug. 30, 2011

(54) METHOD AND APPARATUS FOR PROCESSING DATA

(75) Inventor: Kazuhiro Sakaguchi, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 938 days.

(21) Appl. No.: 11/007,398

(22) Filed: Dec. 8, 2004

(65) Prior Publication Data

US 2005/0160068 A1     Jul. 21, 2005

(30) Foreign Application Priority Data

Dec. 26, 2003  (JP) ................. 2003-435450

(51) Int. Cl.
*G06F 7/04*     (2006.01)

(52) U.S. Cl. ................. 726/27; 726/2; 707/802

(58) Field of Classification Search .............. 726/26–33, 726/2; 713/193
See application file for complete search history.

(56) References Cited

U.S. PATENT DOCUMENTS

| | | | |
|---|---|---|---|
| 6,405,278 B1 * | 6/2002 | Liepe | 711/103 |
| 6,633,871 B1 * | 10/2003 | Jeyachandran et al. | 1/1 |
| 6,851,020 B2 * | 2/2005 | Matsumoto et al. | 711/112 |
| 6,917,570 B2 * | 7/2005 | Morisaki | 369/30.55 |
| 6,937,356 B1 * | 8/2005 | Ito et al. | 358/1.16 |
| 7,089,593 B1 * | 8/2006 | Dono et al. | 726/26 |
| 7,243,230 B2 * | 7/2007 | England et al. | 713/168 |
| 7,356,704 B2 * | 4/2008 | Rinkevich et al. | 713/183 |
| 2002/0165008 A1 | 11/2002 | Sashihara et al. | |

FOREIGN PATENT DOCUMENTS

| | | |
|---|---|---|
| EP | 489467 A1 * | 6/1992 |
| JP | 05-324212 | 12/1993 |
| JP | 06-012538 | 1/1994 |
| JP | 06-105046 | 4/1994 |
| JP | 2000-308126 | 11/2000 |
| JP | 2001-134691 | 5/2001 |
| JP | 2002-300254 | 10/2002 |
| JP | 2003-244449 | 8/2003 |
| JP | 2003-264631 | 9/2003 |

* cited by examiner

*Primary Examiner* — Farid Homayounmehr
*Assistant Examiner* — Amare Tabor
(74) *Attorney, Agent, or Firm* — Canon USA Inc. IP Division (57) ABSTRACT

A data processing apparatus for processing and protecting data stored in a removable storage medium, including a medium monitoring unit configured to monitor the state of the removable storage medium, an information storage unit configured to store information, and a controller configured to move the data from the removable storage medium to the information storage unit in accordance with the monitoring result of the medium monitoring unit.

5 Claims, 4 Drawing Sheets

| USER ID | USE FLAG | DEVICE NO. |
|---------|----------|------------|
| 001 | 1 | D01 |
| 002 | 0 | NONE |
| 003 | 0 | NONE |

FIG. 6

METHOD AND APPARATUS FOR PROCESSING DATA

BACKGROUND OF THE INVENTION

1. Field of the Invention

The present invention relates to a data processing apparatus for allowing a removable storage medium to be connected thereto and a data processing method of the apparatus. In particular, the present invention relates to a method for protecting user data in a storage medium left in the apparatus by the user after use in an environment where third parties have access to the storage medium.

2. Description of the Related Art

Some data processing apparatuses that read data from a storage medium to process the data display a warning to draw a user's attention if the user leaves the apparatus with the storage medium therein (Japanese Patent Laid-Open No. 05-324212).

According to that system, which employs a user authentication function, once a user logs in, the user cannot log out without unloading the storage medium. Thus, the data on the storage medium is protected.

More specifically, the logout control method of that system, a message, a light signal, or an audible sound is provided to alert the user that a storage medium has been left in the apparatus. However, the user may fail to pay attention to the alert when leaving the apparatus. In such a case, the storage medium is left in the apparatus, and thus a third party could either easily access the data in the storage medium on the apparatus or simply take the storage medium. In an IC card authentication system used for user authentication, since there is a notion that merely disconnecting the IC card completes the logout process even with the IC card still in its slot in the apparatus, many users leave the IC card in the slot. The above-described alert output is a mere warning and does not provide sufficient security to the data on the storage medium.

Even if a third party carries a storage medium left and connected in the slot thereof, the data in the storage medium is preferably protected. When the owner of the storage medium logs in the system again, the data in the storage medium is preferably recovered.

SUMMARY OF THE INVENTION

An aspect of the present invention is to protect data in a storage medium.

According to a first aspect of the present invention, a data processing apparatus for processing data stored in a removable storage medium, includes a medium monitoring unit configured to monitor the state of the removable storage medium, an information storage unit configured to store information, and a controller configured to control the movement of the data from the storage medium to the information storage unit in accordance with the monitoring result of the medium monitoring unit.

According to a second aspect of the present invention, a data processing method for processing data stored in a removable storage medium, includes the steps of monitoring the state of the removable storage medium, and controlling the movement of the data from the storage medium to an internal memory in accordance with the monitoring result of the medium monitoring unit.

The aspects of the present invention are achieved by each of a computer program including program codes (i.e., computer-executable process steps) of the data processing method and a storage medium having stored the computer program.

According to a third aspect of the present invention, a data processing apparatus for processing data stored in a removable storage medium includes a determining unit configured to determine whether the removable storage medium is unloaded if a predetermined condition is satisfied, an information storage unit configured to store information, and a controller configured to control the movement of the data from the removable storage medium to the information storage unit if the determining unit determines that the storage medium is not unloaded.

Further aspects, features, and advantages of the present invention will become apparent from the following description of the exemplary embodiments with reference to the attached drawings.

DESCRIPTION OF THE EMBODIMENTS

The embodiments of the present invention are described below with reference to the drawings. In the following discussion, a "user identification (ID)" is set for each user, and is used to identify the user at a login. A "use flag" indicates the loaded or unloaded state of a storage medium which is loaded by the user for login. A "device number" is an ID assigned to a media device corresponding to the use flag, where each media device is assigned a respective device number. The devices are thus identified by the device number thereof.

Figure 1:
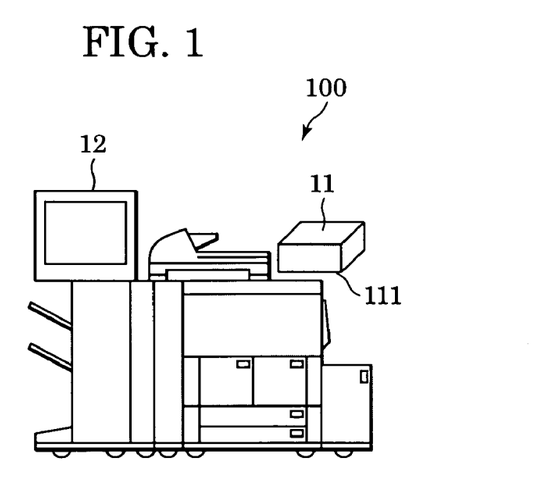
FIG. 1 is an external view of a data processing apparatus in accordance with an embodiment of the present invention.

FIG. 1 shows a digital multi-function apparatus 100 of one embodiment of the present invention.

The digital multi-function apparatus 100 includes a scanner 22 (shown in FIG. 2), a printer 21 (shown in FIG. 2), a hard disk (HD) 24 (shown in FIG. 2), a media device 11, an input device 26 (shown in FIG. 2) as a user interface (UI), and a display 12. The function of each of these elements is illustrated in a function block diagram of FIG. 2. Only both the media device 11 and the display 12 are shown in the external view of FIG. 1. The digital multi-function apparatus 100 also has a function of a user authentication function. illustrated in a function block diagram of FIG. 2. Only both the media device 11 and the display 12 are shown in the external view of FIG. 1. The digital multi-function apparatus 100 also has a function of a user authentication function.

Figure 2:
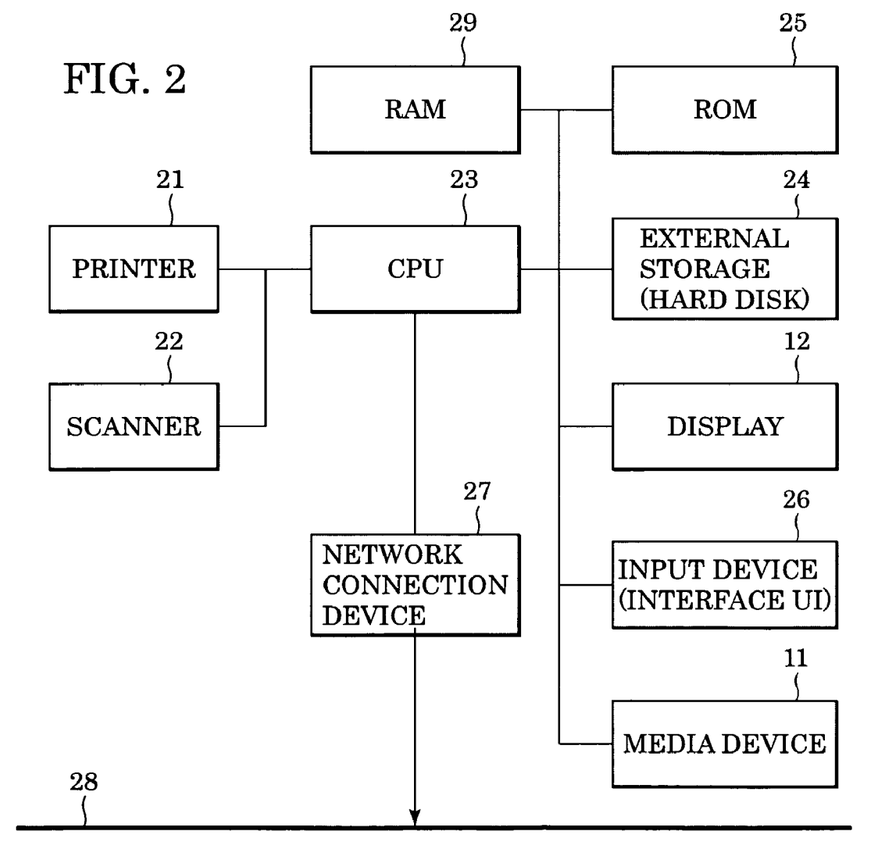
FIG. 2 is a hardware block diagram of the data processing apparatus in accordance with an embodiment of the present invention.

Referring to FIG. 2, the digital multi-function apparatus 100 of FIG. 1 is described now. As shown, the printer 21 prints data stored in the external storage 24, internal data stored in a removable storage medium (not shown), or print job data transferred from an external network 28. The scanner 22 optically scans an original document sheet to read data of the original document, converts the read data into internal data appropriate for printing and displaying, and then stores the internal data onto the hard disk 24, for example.

Under the control of a control program of a media device controller 35 (shown in FIG. 3), the media device 11 reads data from or stores data to a removable storage medium, such as CompactFlash®. The CompactFlash® may be inserted (loaded) into a storage media slot 111 of the media device 11 of FIG. 1. A user inputs predetermined instructions to the digital multi-function apparatus 100, including login and logout instructions, using the input device 26. The display 12 temporarily displays data scanned by and captured by the scanner 22 or internal data to be printed for verification. The display 12 also displays a progress status of a print process or a scan process, and an instruction to prompt the user to enter an input. The display 12 may include a liquid-crystal touch panel or the like, and may have a display function and a function of the input device 26. The storage media may be any type of storage medium, including but not limited to CompactFlash®, a floppy disk, a memory stick, and a secure digital (SD®) card.

The digital multi-function apparatus 100 is connected to the external network 28 through a network connection device 27. For example, print job data is transferred from another computer connected to the external network 28, and printed on the printer 21 or stored in the hard disk 24.

A read-only memory (ROM) 25 stores programs for causing the digital multi-function apparatus 100 to perform a variety of processes. The processes include a monitoring process of a storage medium, user authentication, control of the storage medium, and data processing of the storage medium, such as data reading and writing processes to a user personal area. A random-access memory (RAM) 29 temporarily stores an instruction input from the input device 26 and the result of detection of the storage medium. A program responsive to an instructed process is read from the ROM 25 and expanded into the RAM 29 before being executed.

The above-mentioned elements of FIG. 2 are connected to each other via a central processing unit (CPU) 23. The CPU 23 generally controls all the elements.

Figure 3:
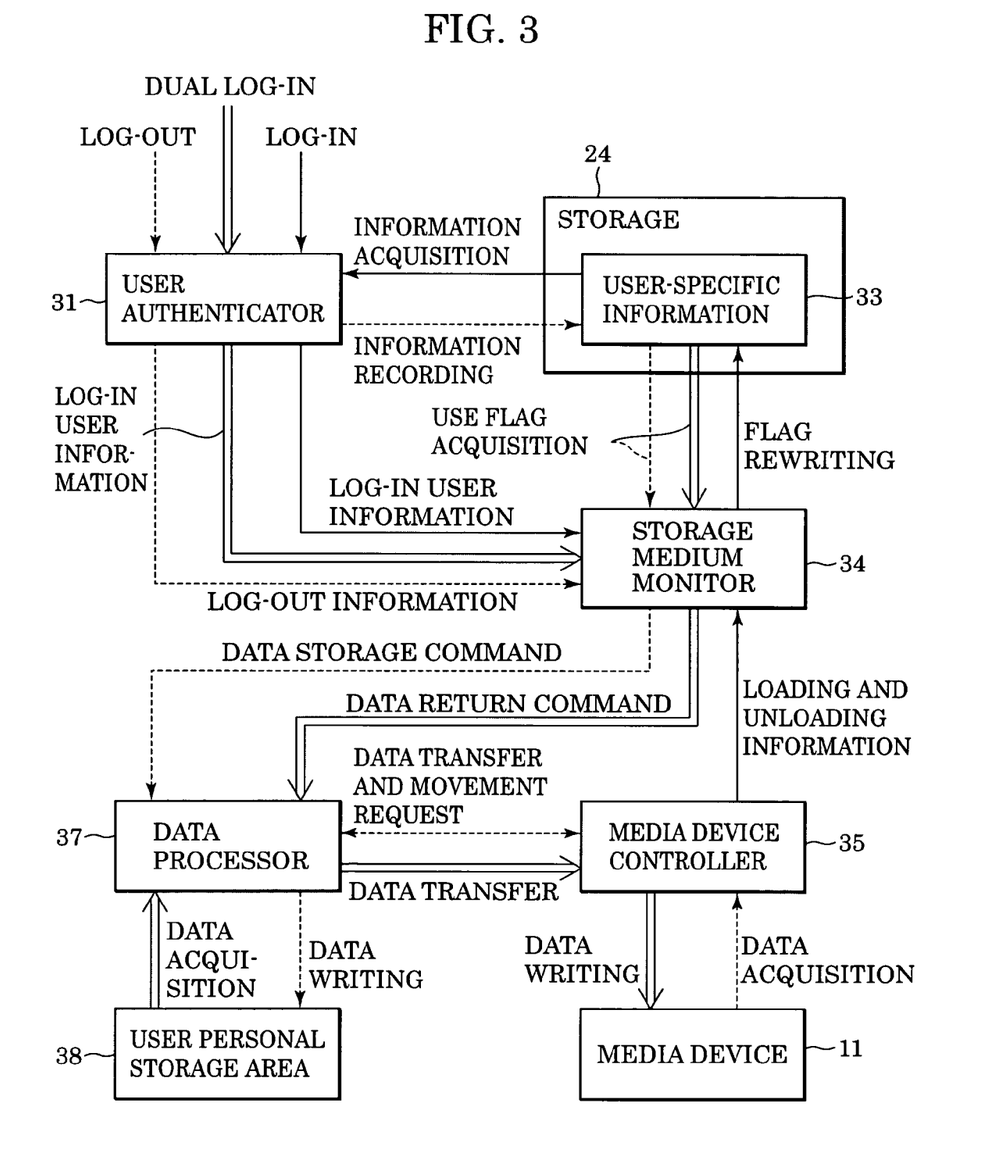
FIG. 3 is a functional block diagram of the data processing apparatus in accordance with an embodiment of the present invention.

FIG. 3 illustrates a concept of information processing wherein the digital multi-function apparatus 100 performs the functions of one embodiment of the present invention. Arrow-headed solid lines represent the flow of data when the digital multi-function apparatus 100 operates subsequent to a login. Arrow-headed broken lines represent the flow of data in a data retrieval operation subsequent to a logout when the digital multi-function apparatus 100 is turned off. Arrow-headed double solid lines represent the flow of process when a second login is performed with the storage medium left in the digital multi-function apparatus 100.

The process from a first login to a logout represented by the arrow-headed solid lines is described below. When the digital multi-function apparatus 100 is turned on, a display prompting a user to log in is displayed on the display 12. When the user logs in, a user authenticator 31 authenticates the user. More specifically, the CPU 23 determines whether a user ID and a password, input by the user, correspond to a user ID and password that were pre-registered in the user-specific information area 33 of the hard disk 24. If the user ID and the password are registered, processing proceeds to a subsequent step. If the user input data is not registered, either a screen prompting the user to enter the ID and the password again is displayed on the display 12 just in case the user has input wrong data, or a warning message that the digital multi-function apparatus 100 is not usable is displayed on the display 12.

Figure 5:
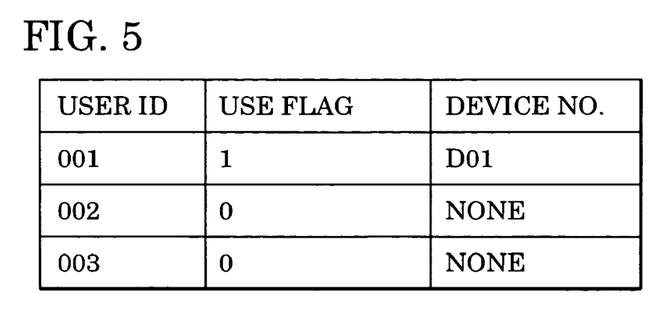
FIG. 5 is a table listing user-specific information stored in a storage area.

At the login phase, the storage medium has not yet been inserted (loaded) into the storage media slot 111 of the media device 11. Therefore, a use flag managed in the user-specific information area 33 remains "0". As shown in FIG. 5, the user-specific information area 33 manages user information on a per user basis. If two users, U1 and U2, use the digital multi-function apparatus 100, the user U1 is assigned a user ID 001 in authentication registration in the digital multi-function apparatus 100, while the user U2 is assigned a user ID 002 in the authentication registration in the digital multi-function apparatus 100. A storage area (folder 001) dedicated to the user ID 001 and a storage area (folder 002) dedicated to the user ID 002, and are thus reserved for the users U1 and U2, respectively.

Turning back to FIG. 3, if the user successively logs in, login user information is input to the storage medium monitor 34. The storage medium monitor 34 monitors whether the storage medium is loaded. For example, if the user U1 successfully logs in, and the storage medium is inserted (loaded) into the media device 11, the media device controller 35 supplies the storage medium monitor 34 with loading information and the storage medium ID. The storage medium monitor 34 determines whether the supplied storage medium ID is "D01", which corresponds to the user U1. If the supplied storage medium ID is D01, the storage medium monitor 34 instructs the user-specific information area 33 to rewrite the use flag from "0" to "1". If the flag is "1", the storage medium D01 of the user U1 is loaded. The storage medium monitor 34 continuously detects the status of the storage medium, i.e., whether the storage medium is loaded or unloaded. If any change is detected, the user-specific information is rewritten accordingly. This process continues until the user logs out.

The user U1 issues a print command to the printer 21. Data is then read from the storage medium, and is printed on the printer 21. The scanner 22 scans the original document sheet, thereby producing image data, and stores the image data in the storage medium. A series of these process steps is performed while the user U1 remains logged in.

The data processing represented by the arrow-headed broken lines is described below. This processing occurs when the user U1 left the digital multi-function apparatus 100 with the storage medium still in the media device 11.

When the user finishes working on the digital multi-function apparatus 100, the user U1 typically logs out from the digital multi-function apparatus 100. In other words, the user inputs a logout instruction through the input device 26. The user authenticator 31 then performs a logout process.

More specifically, the user-specific information input by the user, including "user name", "user ID", and "user-specific information ID", is transmitted to the user-specific information area 33, and the use flag in the information area of each user (here the user U1) is referenced and maintained. The user authenticator 31 notifies the storage medium monitor 34 that the user U1 has logged out. In response to the notification, the storage medium monitor 34 reads the use flag in the user-specific information area 33. Since the user U1 has logged out without unloading the storage medium from the media device 11, the storage medium monitor 34 recognizes that the storage medium remains inserted (loaded) in the media device 11. The storage medium monitor 34 instructs the data processor 37 to move a file in the storage medium. In this movement, the file stored in the storage medium is moved to the user personal storage area 38. This process is intended to prevent the file in the storage medium from being stolen and used in an unauthorized manner.

In response to a file movement command from the storage medium monitor 34, the data processor 37 requests the media device controller 35 to move the file. In response, the media device controller 35 retrieves the predetermined file from the storage medium inserted (loaded) in the media device 11. The retrieved file is written into the user's folder (i.e., folder 001) in the user personal storage area 38 in the hard disk 24 via the data processor 37. The logout process of the user U1 is thus complete. FIG. 3 depicts the user personal storage area 38 and the hard disk 24 as physically separate entities. In another embodiment, the user personal storage area 38 is part of the hard disk 24.

The storage medium remains inserted (loaded) in the media device 11, although no user is logged onto the digital multi-function apparatus 100. Under this condition, the storage medium can be unloaded and taken away by a third party. Since all of the user's U1 data files were moved to the user's folder (i.e., folder 001) in the user personal storage area 38 of the digital multi-function apparatus 100, even if a third party takes the storage medium, the data files of the user U1 are protected. Thus, the above-described series of process steps of removing the data file from within the storage medium and storing it on the digital multi-function apparatus 100 protects the data file should someone other than the user unload the storage medium.

The process of a second login of the user U1, as represented by the arrow-headed double solid lines, is now described. Since the user U1 left the storage medium loaded upon the previous logout, the storage medium remains inserted (loaded) at the time of the second login.

When the user U1 logs in for the second time, the user authenticator 31 performs user authentication as described above. The login user information is supplied to the storage medium monitor 34. Upon receiving the login user information, the storage medium monitor 34 acquires the use flag of the user U1 from the user-specific information area 33. Since the storage medium remains inserted (loaded), the flag is "1". The display 12 displays a message that the storage medium has been loaded. The method of displaying the message is well-known in the art, and thus, a detailed description is not provided herein.

The storage medium monitor 34 issues a data return command to the data processor 37. In a data return process, the data that was retrieved from the storage medium at the latest process and temporarily stored in the user personal storage area 38 is returned back to the storage medium.

Upon receiving the command from the storage medium monitor 34, the data processor 37 acquires the data file from the user's folder (i.e., folder 001) of the user personal storage area 38 and instructs the media device controller 35 to write the data file onto the storage medium. In response to the instruction, the media device controller 35 writes the date file. The user U1 can thus unload the storage medium with the data file in the same state as the user left it.

A process of the login of the user U2 with the storage medium of the user U1 remaining loaded in the media device 11 is described below. This process is not illustrated in FIG. 3. To allow the user U2 to log in, information required for login is input from the input device (Interface UI) 26. The input information is transmitted to the user authenticator 31. The login process for the user U2 (with the user ID of 002) now starts. Since the storage medium of the user U2 is not yet inserted (loaded, the use flag remains "0" in the user-specific information area 33. Although the use flag is "0", the login process of the user U2 successfully completes, and the user U2 is permitted to operate the digital multi-function apparatus 100.

In this embodiment, the loaded and unloaded state is managed on a per user basis, independent of the use flag associated with the user U1. Even though the user U2 has logged in, the user U2 is not permitted to access the protected folder (folder 001) of the user U1. Thus, the user U2 is unable to gain access to the data file in the folder 001. Even if another user logs in, the data file in the storage medium of the user U1 is protected. The user U2 logs out, and the process ends.

The operation of the embodiment has been discussed with reference to the hardware structure of the digital multi-function apparatus 100. The software operation of the present embodiment is described below with reference to the flowchart of FIG. 4.

Figure 4:
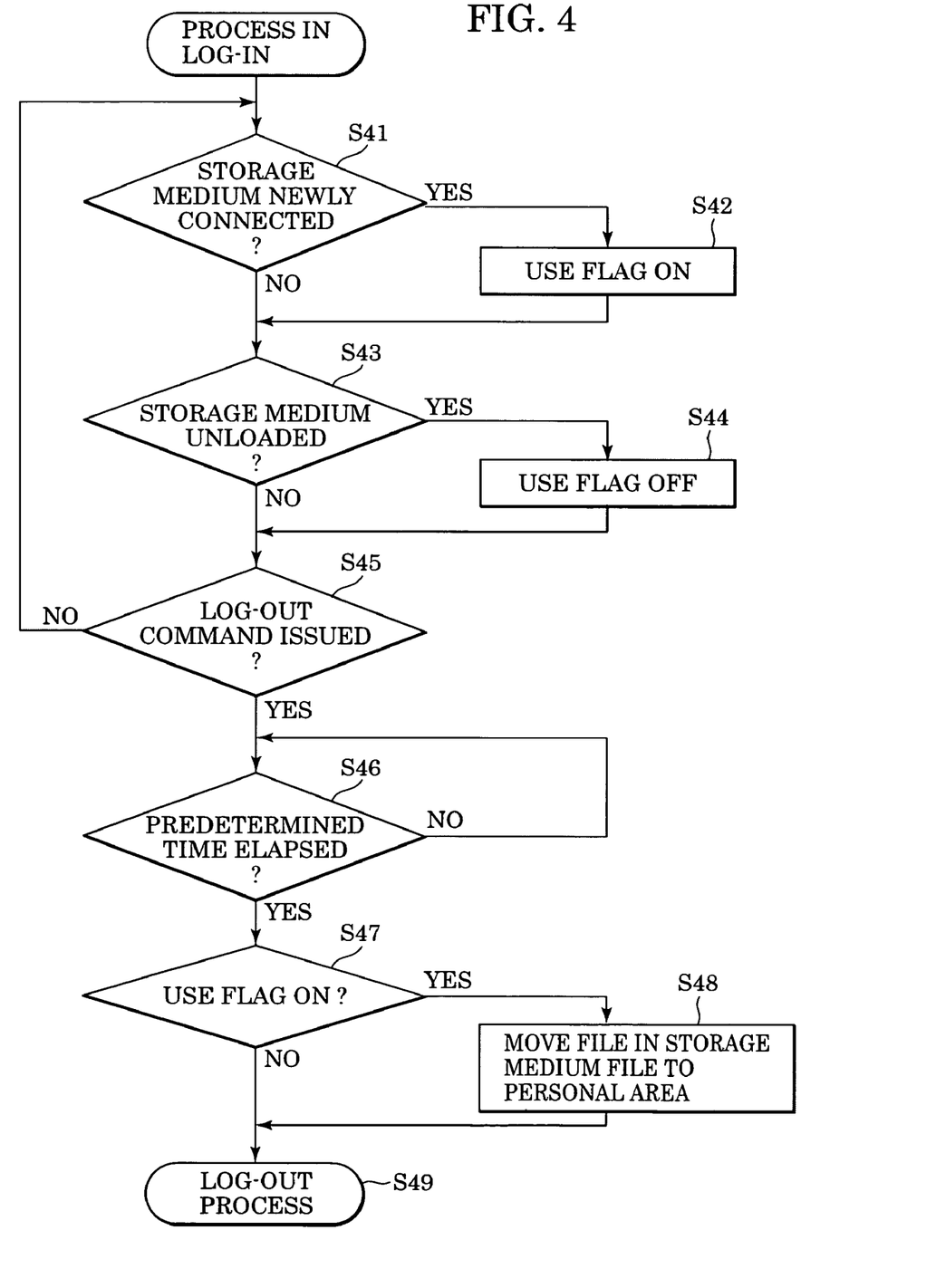
FIG. 4 is a flowchart of a storage medium monitoring process and a logout process in the data processing method in accordance with an embodiment of the present invention.

FIG. 4 is the flowchart illustrating a storage medium monitoring process at the user login and logout process. The user authentication process is performed prior to the processing of the flowchart of FIG. 4, and authentication is successfully completed prior to proceeding to the process of FIG. 4. The program for executing the process is stored in the ROM 25 and executed by the CPU 23.

First, in step S41, the CPU 23 determines whether the user (e.g., U1) has loaded the storage medium into the media device 11. If loading of the storage medium is detected, processing proceeds to step S42. If loading of the storage medium is not detected, processing proceeds to step S43.

In step S42, the use flag is set to "on". As shown in FIG. 5 and as described above, the hard disk 24 has a dedicated storage area for managing the user information on a per user basis. The loaded and unloaded state of the storage medium is managed on a per user basis in the storage area. If the storage medium is loaded, the use flag is set to "1", and if the storage medium is not loaded, the use flag is set to "0". Since it is determined in step S41 that the storage medium is loaded, the use flag is currently "1". Subsequent to the flag setting, processing proceeds to step S43.

The CPU 23 determines in step S43 whether the storage medium has been unloaded from the media device 11. This determination is performed regardless of whether the login process or any other process is in progress. If the CPU 23 determines in step S43 that the storage medium has been unloaded, processing proceeds to step S44. If the CPU 23 determines in step S43 that the storage medium remains loaded, processing proceeds to step S45.

In step S44, the use flag in the user personal storage area 38 in the hard disk 24 is changed from "on" to "off", namely, from "1" to "0". Subsequent to the completion of the flag setting, processing proceeds to step S45.

The CPU 23 determines in step S45 whether the user has issued a logout command. If no logout command is issued, processing returns to step S41 to repeat steps S41-S45. If a logout command is issued, processing proceeds to step S46.

Until the logout command is issued by the user, steps S41-S45 are repeated to monitor and manage the loaded and unloaded state of the storage medium even when the loading or unloading operation of the storage medium is in progress.

In step S46, the CPU 23 determines whether a predetermined period of time has elapsed since the issue of the logout command. If the predetermined period of time has not elapsed, the CPU 23 remains on standby until the predetermined period of time has elapsed. If the predetermined period of time has elapsed, processing proceeds to step S47. The process in step S46 is optional, and in another embodiment of the present invention, it may be omitted. If the process in step S46 is omitted, the CPU 23 proceeds to step S47 in response to the issue of the logout command.

The CPU 23 determines in step S47 whether the use flag of the user U1 managed by the user personal storage area 38 in the hard disk 24 is "1" (on). If the use flag is "1" (on), the storage medium remains loaded, and processing proceeds to step S48, where a process to protect the file in the storage medium is performed. More specifically, the file is moved from the storage medium to a file folder (e.g., folder 001) in the user personal storage area 38. Thus, no files remain on the storage medium. Therefore, should a third party unload the storage medium, while the storage medium is taken, the files are not. After the files are moved, the process proceeds to step S49.

If the use flag is "0" (off), it is determined that the user U1 has left the digital multi-function apparatus 100 with the storage medium unloaded. Processing proceeds to step S49, where the logout process completes.

As described, if a predetermined time elapse determination process is performed, it occurs in step S46. Alternatively, in step S48, a predetermined time period notice is permitted for the user to unload the storage medium before the data is moved from the storage medium instead of the previously described method where the data is immediately moved at the logout.

Figure 6:
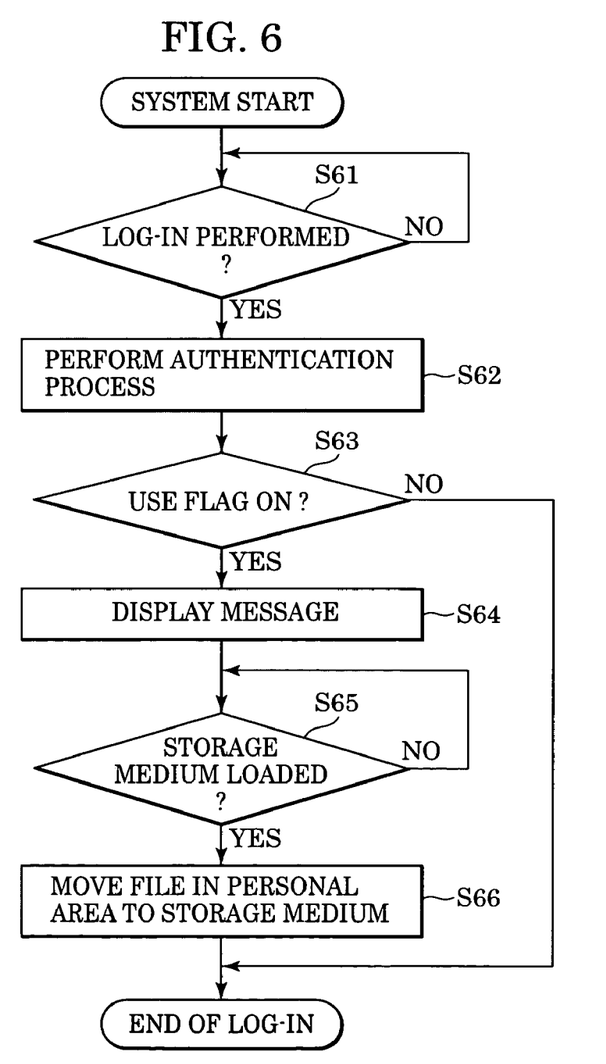
FIG. 6 is a flowchart of a second login process that is performed when the storage is left forgotten in the data processing method in accordance with an embodiment of the present invention.

FIG. 6 illustrates a process of a second login performed by the user U1 after the user U1 realizes that the user U1 left the storage medium in the media device 11.

In step S61, the CPU 23 determines whether the user U1 has logged in. This determination is performed based on whether required information is input by the user U1 at the login. If the user U1 has logged in, processing proceeds to step S62. If the user U1 has not logged in, the CPU 23 waits on standby.

In step S62, the authentication process of the user U1 is performed. If the authentication process successfully completes, processing proceeds to step S63. If the authentication process does not successfully complete, the user U1 may be requested to enter the login input again. This process is not depicted in the flowchart of FIG. 6 since it was previously discussed with respect to FIG. 3.

In step S63, the CPU 23 examines the user personal storage area 38 in the hard disk 24 corresponding to the user U1 to determine whether the use flag is "on" ("1") or "off" ("0"). If the flag is "on", or in other words, if the user's U1 storage medium remains loaded in the media device 11, processing proceeds to step S64. If the use flag is "off", or in other words, if the user's U1 storage medium is unloaded, the login process completes. If the login process completes, the process of the flowchart of FIG. 4 is executed. In step S64, the CPU 23 displays an alert (e.g., warning message) on the display 12 to the user U1 that the storage medium was left in the media device 11. The user U1 could learn the forgotten storage medium at this moment.

In step S65, the CPU 23 determines whether the storage medium is loaded. If the storage medium remains loaded, processing proceeds to step S66. If the storage medium is unloaded, the CPU 23 waits in standby until the storage medium is loaded. In this case, the CPU 23 can display a message on the display 12 to prompt the user U1 to load the storage medium.

In step S66, the file temporarily stored in the folder 001 of the user personal storage area 38 of the hard disk 24 (i.e., the file moved from the storage medium in step S48 of FIG. 4) is returned to the storage medium. When the return process in step S666 is complete, the login process ends. Upon the completion of the process, the user U1 can access the file in the storage medium in the same state the user U1 originally left it in. The process of the flowchart of FIG. 4 is then performed.

If the storage medium is unloaded at the second login of the user U1, the return process of the data file is not performed until the storage medium is loaded. This ensures that all the data originally on the storage medium can bee fully recovered.

As described above, the data processing system using the removable storage medium includes the user authenticator for identifying an accessing user and for managing the user-specific information, the storage unit for storing the user-specific information, the media device for handling the storage medium, the media device controller for controlling the media device, the storage monitor for monitoring the loaded state of the storage medium in the media device, and the data processor for writing data from the storage medium to the user personal storage area 38 and reading the data from the user personal storage area 38.

The data processing system further includes a storage medium monitoring unit for monitoring the connection state of the storage medium and storing the connection state on a per user basis, a data movement unit for moving data from within the storage medium to the user personal storage area 38, and a data returning unit for returning data, moved to the storage medium by the data movement unit, to the currently loaded storage medium. Even if the user left the storage medium, the data processing system according to the present invention protects the data in the storage medium. When a second access is performed, the original data is recovered onto the storage medium.

In accordance with the embodiment of the present invention, the data on the storage medium is stored in the user personal storage area 38 when the storage medium remains loaded when the user logs out. The logout is completed when all of the data is transferred from the storage medium. Thus, even if a third party unloads and makes off with the storage medium, the data in the storage medium is protected. When the user of the storage medium logs in again, the stored data is displayed and written onto the storage medium. As such, the data is easily recovered back onto the storage medium.

In one embodiment, at least one media device 11 is connected. However, any number of media devices 11 may be connected. The media devices 11 are identified by the device number thereof. The loading and the unloading of the storage medium of the same user on different media devices 11 is managed on a per media device basis. A plurality of media devices 11 may be managed as a group.

The data processing system of the present invention is not limited to the digital multi-function apparatus 100. The present invention is applicable to any system that would enable practice of the present invention.

A storage medium storing program codes of the software program performing the functions of the embodiment of the present invention is installed in a system or an apparatus, and a computer (CPU or MPU) of the system or the apparatus reads and executes the program codes stored in the storage medium. Such embodiments achieve the aspects according to the present invention. The program codes read from the storage medium perform the functions of the foregoing exemplary embodiment of the present invention, and the storage medium storing the program codes falls within the scope of the present invention. Available as storage media for supplying the program codes are a floppy disk, a hard disk, an optical disk, a magneto-optical disk, a CD-ROM, a CD-R, a magnetic tape, a nonvolatile memory card, an ROM and the like.

By executing the program codes read by the computer, the functions of the foregoing exemplary embodiment are performed. Furthermore, the operating system (OS) running on the computer performs partly or entirely a process in response to the instruction of the program code, and with the process performed, the functions of the above-referenced exemplary embodiment are performed. Such programs codes fall within the scope of the present invention.

The program codes from the storage medium are read into a memory incorporated in a feature expansion board in the computer of in a feature expansion unit connected to the computer. The CPU mounted on the feature expansion board or the feature expansion unit performs partly or entirely the actual process in response to the instruction from the program codes. The functions of the above embodiments are executed through the process. Such program codes fall within the scope of the present invention.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2003-435450 filed Dec. 26, 2003, which is hereby incorporated by reference herein.

What is claimed is:

1. A data processing apparatus for processing data stored in a removable storage medium, the data processing apparatus comprising:
    a storage unit configured to store data information;
    an inputting unit configured to input a login instruction to login a user to the data processing apparatus and a logout instruction to logout the user from the data processing apparatus;
    a first execution unit configured to execute a logout process of a user corresponding to the logout instruction in a case where the inputting unit inputs the logout instruction;
    a first judging unit configured to judge whether the removable storage medium of the user corresponding to the logout instruction remains loaded in the data processing apparatus;
    a first controlling unit configured to, in the case where the first judging unit judges that the removable storage medium of the user corresponding to the logout instruction remains loaded in the data processing apparatus when the inputting unit inputs the logout instruction, store in the storage unit the data stored in the removable storage medium of the user corresponding to the logout instruction, so as to be associated with the user corresponding to the logout instruction, and delete the data from the removable storage medium;
    a second execution unit configured to execute a login process of a user corresponding to the login instruction in a case where the inputting unit inputs the login instruction;
    a second judging unit configured to judge whether the removable storage medium of the user corresponding to the login instruction remains loaded in the data processing apparatus; and
    a second controlling unit configured to, in the case where the second judging unit judges that the removable storage medium of the user corresponding to the login instruction remains loaded in the data processing apparatus when the inputting unit inputs the login instruction, and stores in the removable storage medium of the user corresponding to the login instruction the data which is stored in the storage unit that is associated with the user corresponding to the login instruction.

2. The data processing apparatus according to claim 1, further comprising a notifying unit configured to notify that the removable storage medium remains loaded in the data processing apparatus when the inputting unit inputs the login instruction to login the user corresponding to the logout instruction to the data processing apparatus again.

3. A data processing method for a data processing apparatus that has a storage unit configured to store data and process data stored in a removable storage medium, the data processing method comprising the steps of:
    inputting a login instruction to login a user to the data processing apparatus and a logout instruction to logout the user from the data processing apparatus;
    executing a logout process of a user corresponding to the logout instruction in a case where in the logout instruction is inputted;
    judging whether the removable storage medium of the user corresponding to the logout instruction remains loaded in the data processing apparatus;
    controlling, in a case where it is judged that the removable storage medium of the user corresponding to the logout instruction remains loaded in the data processing apparatus when the logout instruction is inputted, to store in the storage unit the data stored in the removable storage medium of the user corresponding to the logout instruction, so as to be associated with the user corresponding to the logout instruction, and to delete the data from the removable storage medium;
    executing a login process of a user corresponding to the login instruction in a case where the inputting unit inputs the login instruction;
    judging whether the removable storage medium of the user corresponding to the login instruction remains loaded in the data processing apparatus; and
    controlling, in a case where it is judged that the removable storage medium of the user corresponding to the login instruction remains loaded in the data processing apparatus when a login instruction is inputted, and storing in the removable storage medium of the user corresponding to the login instruction the data which is stored in the storage unit and is associated with the user corresponding to the login instruction.

4. Computer-executable process steps embodied on a memory device for causing a data processing apparatus that has a storage unit configured to store data and processes data stored in a removable storage medium, the computer-executable process steps comprising:
    inputting a login instruction to login a user to the data processing apparatus and a logout instruction to logout the user from the data processing apparatus;
    executing a logout process of a user corresponding to the logout instruction in a case where in the logout instruction is inputted;
    judging whether the removable storage medium of the user corresponding to the logout instruction remains loaded in the data processing apparatus;
    executing a logout process of a user corresponding to the logout instruction in a case where in the logout instruction is inputted;
    controlling, in a case where it is judged that the removable storage medium of the user corresponding to the logout instruction remains loaded in the data processing apparatus when the logout instruction is inputted, to store in the storage unit the data stored in the removable storage medium of the user corresponding to the logout instruction, so as to be associated with the user corresponding to the logout instruction, and to delete the data from the removable storage medium;
    executing a login process of a user corresponding to the login instruction in a case where the inputting unit inputs the login instruction;
    judging whether the removable storage medium of the user corresponding to the login instruction remains loaded in the data processing apparatus; and
    controlling, in a case where it is judged that the removable storage medium of the user corresponding to the login instruction remains loaded in the data processing apparatus when a login instruction is inputted, and storing in the removable storage medium of the user corresponding to the login instruction the data which is stored in the storage unit and is associated with the user corresponding to the login instruction.

5. The data processing apparatus according to claim 1, further comprising a printing unit configured to perform printing based on the data stored in the storage unit so as to be associated with the user corresponding to the logout instruction.

* * * * *